(12) United States Patent
Granati et al.

(10) Patent No.: US 6,547,847 B2
(45) Date of Patent: Apr. 15, 2003

(54) CONTINUOUS PROCESS FOR TRANSFORMING MATERIAL, YIELDING CONTROLLED COMPOSITION PRODUCTS AND APPARATUS APT TO CARRY OUT SUCH PROCESS

(75) Inventors: Paolo Granati, Rome (IT); Angelo Colletta, Rome (IT)

(73) Assignee: Centro Sviluppo Materiali S.p.A., Rome (IT)

( * ) Notice: Subject to any disclaimer, the term of this patent is extended or adjusted under 35 U.S.C. 154(b) by 0 days.

(21) Appl. No.: 09/725,924

(22) Filed: Nov. 30, 2000

(65) Prior Publication Data

US 2002/0100345 A1 Aug. 1, 2002

(51) Int. Cl.$^7$ .............................................. C21B 11/00
(52) U.S. Cl. ............................. 75/414; 75/501; 75/502; 75/961; 266/159
(58) Field of Search ......................... 75/414, 961, 500, 75/501, 502; 266/159

(56) References Cited

U.S. PATENT DOCUMENTS

| | | | | |
|---|---|---|---|---|
| 3,812,620 A | * | 5/1974 | Titus et al. .................... | 75/414 |
| 5,322,547 A | * | 6/1994 | Nagel et al. .................... | 75/414 |
| 5,489,325 A | * | 2/1996 | Keogh et al. ................... | 75/502 |
| 5,733,356 A | * | 3/1998 | Konig et al. .................... | 75/961 |
| 5,746,804 A | * | 5/1998 | Joo et al. ........................ | 75/500 |
| 6,352,574 B1 | * | 3/2002 | Granati et al. ................. | 75/501 |

* cited by examiner

Primary Examiner—Melvyn Andrews
(74) Attorney, Agent, or Firm—Browdy and Neimark, P.L.L.C.

(57) ABSTRACT

A continuous process and apparatus for transforming, by chemico-physical reactions inside molten slag, materials to be gasified, thermally destroyed, inertized, or from which elements of commercial value are to be recovered, yielding controlled composition products, in an apparatus made of a single reaction chamber, called reactor, having a substantially cylindrical symmetry, including two portions, a top and a bottom one, said process being characterised in that it comprises the steps of:

Figure 1:
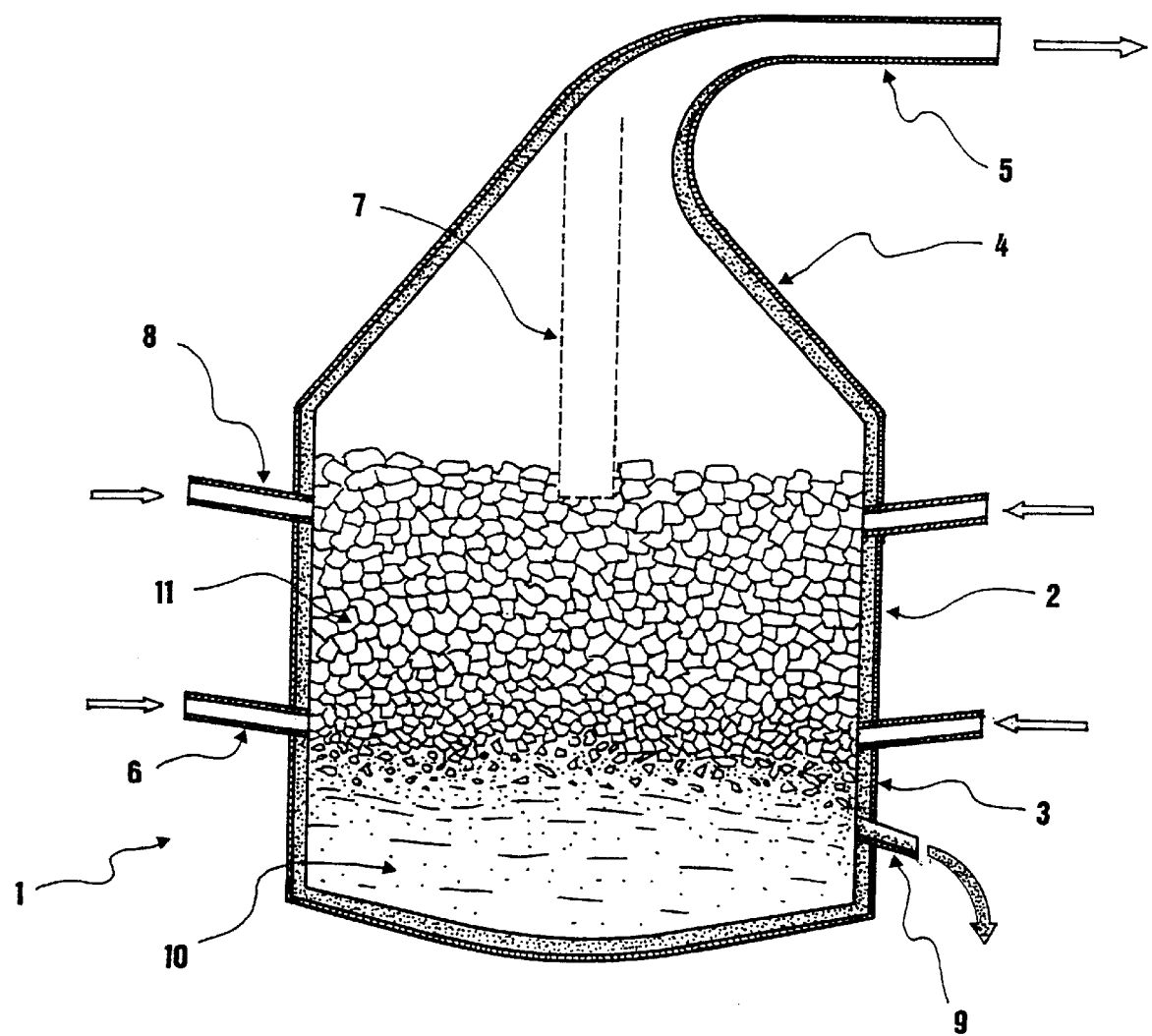

introducing into the bottom portion of the reactor, sideways through a second injection level and/or vertically from the top thereof, the material to be transformed, the fuel, the comburent and possibly slag inoculants and additives and material-carrying gases; and tapping from the bottom portion of the reactor the transformed material, of controlled composition, and the inert slag.

20 Claims, 1 Drawing Sheet

CONTINUOUS PROCESS FOR TRANSFORMING MATERIAL, YIELDING CONTROLLED COMPOSITION PRODUCTS AND APPARATUS APT TO CARRY OUT SUCH PROCESS

DESCRIPTION

The present invention relates to a continuous process for transforming, by chemico-physical reactions inside molten slag, materials to be gasified, thermally destroyed, inertized or from which elements of commercial value are to be recovered, yielding controlled composition products, and to an apparatus apt to carry out such process.

In particular, the present invention relates to a process and to an apparatus substantially made of a reaction chamber, called reactor, for the continuous transforming by chemico-physical reactions inside molten slag of solid, liquid and gaseous material, even of scrap, yielding controlled composition products at the output of the apparatus itself, avoiding difficult to recycle and/or harmful by-products.

The process object of the present invention is a continuous process for transforming, by chemico-physical reactions inside molten slag, solid, liquid or gaseous material—even scrap, to be gasified, thermally destroyed, inertized or from which elements of commercial value are to be recovered, yielding controlled composition products, carried out in an apparatus made of an individual reaction chamber, called reactor, having a substantially cylindrical symmetry, including two portions, a top one and a bottom one, communicating and functionally distinct therebetween for carrying out the process, said process being characterised in that it comprises the steps of:

- possibly, introducing in the top portion of the reactor, through a first injection level, a comburent gas for the post-combustion of the process gases;
- introducing in the bottom portion of the reactor, sideways through a second injection level and/or vertically from the top thereof, the material to be transformed, the fuel, the comburent, and possibly slag inoculants and additives and material-carrying gases;
- possibly, introducing inert stirring gases from the reactor bottom;
- extracting the process the gases from the top portion of the reactor; and
- tapping the transformed material of controlled composition and the inert slag from the bottom portion of the reactor.

The introduction into the bottom portion of the reactor of the material to be transformed, the fuel, the comburent, the possible inoculants and additives and the material-carrying gases can be carried out sideways or vertically from the top thereof. The sideways introduction into the bottom portion of the material to be transformed, together with the fuel, the comburent and the additives, can also be carried out in the radial direction through a plurality of inlets, possibly on different levels.

In an embodiment of the present invention, the material to be transformed, the fuel, a fraction of the comburent, the possible inoculants, additives and material-carrying gases, are introduced into the reactor towards the slag core by horizontal or downwards-slanting injection, and, concomitantly, the remaining comburent fraction is introduced therein with injectors at an upper level.

The material to be transformed may have a granulometry lower than 8 mm.

The granulometry of the fuel and of the additives may be lower than 3 mm.

The injection rate of the comburent into the top portion is lower than 40 m/s, and anyhow such as to allow the individual jets to intermingle thereamong, an effective combustion of the process gas inletted from the bottom portion of the reactor, and the yield of a heat transfer efficiency (THE) greater than 70% between the gas and the molten metal bath.

In embodiments of the process according to the invention the binary basicity index of the slag is greater than 1.

The formation of a slag phase/metal phase emulsion in the bottom portion of the reactor for attaining an efficient heat transfer and elevated reaction kinetics may also be carried out with the injection of stirring gas from the reactor bottom, the power provided by the stirring gas being lower than 2.5 kW per ton of molten metal bath.

The internal pressure of the reactor may range from 1 to 4 bars.

A further subject-matter of the invention is an apparatus for the continuous transforming, by chemico-physical reactions inside molten slag, of materials to be gasified, thermally destroyed, inertized, or from which elements of commercial value are to be recovered, yielding controlled composition products, characterised in that it comprises:

- a reaction chamber, called reactor, having a substantially cylindrical symmetry, including two portions, a top and a bottom one, communicating and functionally distinct therebetween for carrying out the process;
- a substantially frustoconical-shaped connector, between the top portion of the reactor and a flue gas ejection conduit;
- means for feeding, into the bottom portion of the reactor, the material to be transformed, the fuel, possibly the slag inoculants and additives, and the material-carrying gases;
- possibly, means for injecting the comburent in order to carry out the post-combustion of the process gases;
- a tap hole for the transformed material and the slags yielded;
- possibly, means for feeding the stirring gas onto the reactor bottom.

The means for the joint and concomitant feeding of the material to be transformed, the fuel, the comburent and the additives to the bottom portion of the reactor may be nozzles, circumferentially arranged, horizontal or slanting downwards, and oriented centerwise, and possibly of at least one lance, vertically arranged so as to directly inject into the molten slag.

Said nozzles may be slanting downwards of an angle ranging from 0 to 40° with respect to the horizontal plane.

The ratio between the inside height and the inside diameter of the cylindrical chamber, reactor, may range from 1 to 8.

The ratio between the heights of the frustoconical-shaped connector and of the reactor may range from 0.2 to 0.5. The means for feeding the stirring gas into the reactor may be porous baffles located onto the bottom thereof.

The cylindrical top portion of the reactor may be differentially cooled along the height thereof.

The materials to be thermally destroyed, gasified, inertized, or from which products of commercial value are to be recovered are inletted into the reactor, in the portion thereof with the molten slag bath, through a plurality of nozzles, and possibly carried by a material-carrying gas, concomitantly and jointly to the slag additives and inoculants (like, e.g., calcium or magnesium oxides or carbonates), possibly highly reducing metals (like, e.g., aluminium, magnesium), fuel (like pit coal, fuel oil, natural gas or binary or ternary mixtures thereof) and to the comburent (like air, oxygen or a mixture thereof).

The material inletted into the slag meets an elevated temperature environment which, owing to the presence of the fuel carbon and of the carbon monoxide evolved from the partial burning of the fuel with the comburent gas, and to that of possible injected reducing metals, is highly reducing.

All the above leads to a ready reduction of the reducible metallic oxides, like iron, chromium, nickel and lead oxides, and to the evaporation of volatile metals like zinc, lead and cadmium.

The presence of calcium oxide in the slag and the highly reducing environment, needwise enhanced by the reducing metals injected therein, entails that the harmful elements (like, e.g., sulfur and halogens) be incorporated in the slag essentially as calcium salts; the reducing environment avoids the formation of NOx in the process flue gases.

The non-reducible oxides, like CaO, MgO, $SiO_2$, $Al_2O_3$, are completely incorporated, since they dissolve in the slag.

The direct gasification under reducing conditions of the injected carbon-containing materials provides CO; further CO may evolve from the reduction of metallic oxides by the slag-dispersed carbon; the process gas thus evolved may possibly be post-combusted, in order to sustain the thermal state of the reactor, even injecting comburent therein through upperly located nozzles.

The processes implementable according to the present invention in view of the aims thereof require elevated reaction kinetics, depending also on an adequate homogeneity of the bath (made of metallic and of slag phases), and efficient heat exchanges, aims to be attained with a intensive bath stirring.

The bath stirring is essentially carried out by the materials injected with the abovementioned nozzles, and possibly by blowing gas from the reactor bottom.

Hence, the apparatus subject-matter of the present invention provides elevated operative flexibility and specific productivity.

So far, a general description of the present invention has been provided. With the aid of the figure and of the following examples, a detailed description of its embodiments, aimed at making better understood its tasks, features, advantages and operation modes, will hereinafter be provided.

FIG. 1 schematically shows the section of an embodiment of the apparatus according to the present invention.

The apparatus shown in FIG. 1 is made of a substantially cylindrical reactor body 1, having two portions, a top portion 2 and a bottom portion 3, communicating and functionally distinct therebetween for carrying out the process, connected, with a frustoconical-shaped connector 4, to a flue gas ejection conduit 5 (partially illustrated in the Figure) destined to outlet the process flue gases.

In the bottom portion 3 of the reactor, at least one level of slag injectors is located, for the concomitant and joint introduction of the materials to be treated, the fuel, the comburent, the slag additives and inoculants and the carrier gases. The injection is carried out through a plurality of nozzles 6 (two thereof shown in the Figure) circumferentially arranged, with a radial direction of injection, and possibly also through at least one lance 7, vertically arranged so as to directly inject into the slag.

In order to carry out a possible post-combustion, in the top portion 2 of the reactor the injection of comburent through a plurality of nozzles 8, circumferentially arranged, injecting in the radial direction, horizontal or slanting bottomwise (only two thereof shown in Figure), is provided.

Furthermore, in the bottom portion 3 of the reactor a tap hole 9, and the related evacuation system, is provided, through which the tapping of the hot metal 10 and of the molten slag 11 is carried out.

In light of the aims of elevated efficiency of the chemical reactions and of flexibility and productivity of the reactor, elevated reaction kinetics are required, the latter also depending on an adequate homogeneity of the bath (made of metal and slag phases) and on efficient heat transfers. These aims are to be attained by intensive bath stirring.

The bath stirring is essentially carried out by the materials injected with carrier gases through the nozzles 6, possibly through the lance 7 and by the comburent gas injected through the nozzles 8. An inert gas blowing from the reactor bottom with porous baffles (not shown in Figure) may also be provided therefor.

As it is apparent from the following examples, the embodiment of the reactor remains substantially unchanged for processes of different nature. Thus, the flexibility of the plant for processes with different technological aims, yet all based on the same principle of slag phase reactions, is highlighted.

EXAMPLE 1

The features of the embodiment of the apparatus according to the invention used in this example are shown in the following table 1.1.

TABLE 1.1

| | |
|---|---|
| D: reactor body inside diameter | 2 m |
| H: overall reactor height (frustoconical shaped connector included) | 5.8 m |
| Frustoconical-shaped connector height | 2.3 m |
| Frustoconical-shaped connector spread | 78° |

In this example the above-identified plant is ran for the treatment of dusts yielded from electric arc furnace carbon steelmaking process (EAF dusts).

The introduced materials and the flow rates thereof (kg/h for the solids, $Nm^3/h$ for the gases) are shown in Table 1.2.

TABLE 1.2

| | |
|---|---|
| EAF dusts from carbon steelmaking | 3000 kg/h |
| Fuel | 2064 kg/h pit coal |
| Primary comburent | 1050 $Nm^3/h$ $O_2$ |
| Additives | 143 kg/h MgO |
| Comburent for post-combustion | 571 $Nm^3/h$ $O_2$ |

The EAF dusts are injected, with inert gas, under the molten slag into the reactor, concomitantly and jointly to the pit coal, the oxygen and the magnesium oxide, through the lower level injectors.

The molten slag over the hot metal bath has a lower than 1600° C. temperature so as to highly limit the evaporation of the metallic elements (like iron) and it will have a viscosity lower than 4 Poise at 1400° C. so as to ensure an effective homogenising of the reaction environment.

Moreover, the slag composition should be such as to limit the wear of the refractory lining of the reactor (carbon-bonded magnesia refractories in the example) the percentage of magnesium oxide in the slag should be greater than 8%.

The binary basicity of the slag (%CaO/%SiO$_2$) should range from 1 to 1.5.

Once injected in the slag, the mixture of EAF dusts, fuel and slag inoculants meets a high-temperature environment which is highly reducing due to the presence of gases evolved during the gasification of the fuel and of the residual fuel left over.

All this leads to a ready reduction of the reducing metallic oxides in the mixture (e.g., iron, zinc, lead).

Owing to a bath temperature greater than 1450° C., the metals and the volatile oxides (like zinc and lead oxide) are completely exhausted (outletted) from the bath as vapours, to be subsequently recovered for the recycling thereof. The remaining metals, essentially iron, dissolve in the hot metal bath which is carburized by the fuel in excess dispersed into the molten slag phase.

The presence of calcium oxide in the charge and the higly reducing environment entail that the halogens and the harmful elements like sulfur are incorporated into the slag as calcium salts. The non-reducible salts (like CaO, MgO, SiO$_2$, Al$_2$O$_3$) are completely retained in the bath, as they dissolve into the slag.

The combined fuel/comburent injection provides the energetic contribution required to carry out the process and to sustain the thermal state of the reactor. The control of the thermal state is carried out operating a partial post-combustion of the process gas injecting comburent through the upper level nozzles.

The stirring of the system (hot metal bath and molten slag) by blowing gas from the reactor bottom ensures the thermal and chemical bath homogeneity, increasing the process kinetics.

This operation mode yields a metal phase, a slag phase and a gaseous phase from the injected materials (EAF dusts, fuel, inoculants), which, by virtue of the filtering action of the slag, is essentially made of permanent gases (like nitrogen, carbon monoxide, carbon dioxide and hydrogen), steam and zinc and lead vapours. The resulting aeriform mix is free of harmful compounds (like SOx, NOx, chlorinated compounds and dusts).

The process gas continuously outletted from the reactor is piped to the zinc and lead recovery plants and to the recovery of the thermal energy contained therein.

The metal phase and the molten slag are intermittently tapped from the reactor opening the tap hole provided for the purpose.

The materials outletted from the apparatus are shown in Table 1.3.

TABLE 1.3

| Flue gases outletted from the reactor | 3000 kg/h |
| --- | --- |
| Tapped metal phase | 750 kg/h |
| Tapped slag | 1050 kg/h |

Some of the quantities useful to define a proper carrying out of the process in terms of chemical reactions and heat exchange are shown in Table 1.4.

TABLE 1.4

| Hot metal bath stirring power | 0.5 kW/t of bath metal |
| --- | --- |

TABLE 1.4-continued

| Metal phase mass/Reactor slag mass ratio | phase 1.0 |
| --- | --- |

EXAMPLE 2

The features of the embodiment of the apparatus according to the invention used in this example are analogous to those disclosed in the preceding Table 1.1.

The example relates to the use of the reactor for the carbon gasification finalised to the production of a CO— and H$_2$-rich gas that be free of dusts, polluting or harmful compounds (sulfurated compounds, NOxs)

The inletted material and the flow rates thereof are shown in TABLE 2.1 (kg/h for the solids, Nm3/h for the gases)

TABLE 2.1

| Powdered pit coal | 3000 kg/h granulometry <100 μm |
| --- | --- |
| Comburent | 2300 Nm3/h O$_2$ |
| Additives | 150 kg/h (CaO + MgO) |
| Comburent for post-combustion | 2300 Nm3/h O$_2$ |

The coal gasification takes place in presence of a basic slag in a reducing environment, allowing on the one hand to incorporate in the slag as stable compounds the sulfur evolved from the coal gasification, on the other hand solubilizing and readily inertizing the ashes resulting therefrom.

Moreover, the ready reduction of the metallic oxides (e.g., FeO$_x$, MnO) in the ashes is obtained, and the metals thus yielded dissolve into the hot metal bath which is carburized by the fuel dispersed in the molten slag.

The in-slag gasification provides several advantages:
the sulfur proneness to solubilize in the metal phase is opposed, hence the quality of the metal phase itself is improved;
the quantity of sulfur in the process gas is kept at very low values, with the entailed environmental advantages;
the presence of calcium oxide in the charge and the highly reducing environment entail the halogens and the harmful elements like the sulfur to be incorporated in the slag as calcium salts. The non-reducible oxides (like CaO, MgO, SiO$_2$, Al$_2$O$_3$) are completely incorporated in the bath, as they dissolve in the slag;
the presence of calcium oxide in an adequate concentration also allows the ready fixation as calcium silicates of the silica provided by the coal ashes, inertizing the latter; as an additional advantage, a local silica concentration in the slag is prevented, limiting the chemical attack to the refractories lining the injection nozzles.

The molten slag over the hot metal bath has a temperature lower than 1600° C. so as to highly limit the evaporation of the metallic elements (like iron), and at 1400° C. it will have a viscosity lower than 4 Poise, thus ensuring an effective blow-by and hence a remarkable homogeneity of the reaction environment.

Moreover, the slag composition should be such as to limit the wear of the refractories lining the reactor; in the example with carbon-bonded magnesia refractories, the percentage of magnesium oxide in the slag should be greater than 8%.

The binary basicity of the slag (CaO/SiO$_2$) should range from 1 to 1.5.

The coal gasification carried out by the comburent concomitantly and jointly injected through the lower level injectors is finalised to the production of CO and $H_2$.

In order to maintain the thermal state of the reactor, this gas may be partially post-combusted with comburent injected through the upper level injectors.

Needwise, in order to implement a thermal and chemical homogeneity of the bath apt to ensure elevated reaction kinetics, inert gas (e.g., $N_2$) may be blown in the former from the reactor bottom.

This operation mode yields from the injected materials (pulverised pit coal, comburent, additives) a gaseous phase made of permanent gases (like nitrogen, carbon monoxide, carbon dioxide and hydrogen) and steam, free, by virtue of the filtering action of the slag, of harmful compounds like $SO_x$, $NO_x$, chlorinated compounds and dusts.

The process gas continuously outletted from the reactor is piped to recycling plants. The metal phase and the slag are intermittently tapped from the reactor opening the tap hole provided therefor.

The materials outletted from the apparatus are shown in Table 2.2.

TABLE 2.2

| | |
|---|---|
| Flue gases outletted from reactor | 6310 kg/h |
| Metal phase | 100 kg/h |
| Slag | 350 kg/h |

The quantities useful to define a proper carrying out of the process, in terms of chemical reactions and of heat exchange, are shown in Table 2.3.

TABLE 2.3

| | |
|---|---|
| Hot metal bath stirring power | 0.5 kW/t metal phase of hot metal bath |
| Metal phase Mass/reactor slag mass ratio | 1.0 |

EXAMPLE 3

The features of the embodiment of the apparatus according to the invention used in this example are analogous to those disclosed in the preceding Table 1 of Example 1.

The example relates to the use of the apparatus for the thermal destruction of Polychlorobenzene- (PCB-) containing materials, yielding CO, $H_2$ and chlorides of slag-fixed alkali-earth metals.

The inletted materials and the flow rates thereof (kg/h for the solids, Nm3/h for the gases) are shown in Table 3.1.

TABLE 3.1

| | |
|---|---|
| PCB-containing materials | 300 kg/h |
| Comburent | 800 Nm3 $O_2$ |
| Pit coal | 600 kg/h |
| Additives | 30 kg/h Al |
| | 130 kg/h CaO + MgO |
| Comburent for post-combustion | 80 Nm3 $O_2$ |

In the use of the apparatus for the thermal destruction (present example) the aluminium is introduced from the top with the injection lance.

The slag having high liming activity, jointly to the presence of metallic aluminium, allows the PCB-like substances containing chlorine and hydrogen to yield hydrochloric acid, that is rapidly fixed in the slag according to the reaction:

$$2Al + 3CaO + 6HCl \rightarrow 5CaCl_2 + Al_2O_3 + 3H_2$$

and, under these conditions, the formation of harmful chlorinated gases like, e.g., phosgene, dioxins and polychlorofurans is avoided.

The thermodynamic activity of the lime in the slag should be greater than 0.05, and preferably ranging from 0.1 to 0.5.

Moreover, the slag composition should be such as to limit the wear of the refractories lining the reactor (in the example, carbon-bonded magnesia refractories). The percentage of magnesium oxide in the slag should be greater than 8%. In this case the working temperature of the slag ranges from 1600 to 1650° C.

This operation mode yields from the injected materials (PCB-containing materials, comburent and inoculants), a metal phase (essentially evolved from the metallic kinds in the carbon ashes) a slag phase and a gaseous phase which, by virtue of the filtering action of the slag, is essentially made of permanent gases (like nitrogen, carbon monoxide and hydrogen) and steam, free of harmful compounds (chlorinated compounds and dusts).

The process gas, continuously outletted from the reactor, is piped to the recycling plants.

The thermal state is controlled by operating a partial post-combustion of the process gas, injecting comburent through a second level of injectors.

The stirring of the system (hot metal bath and molten slag) obtained with the injection of the abovementioned materials and possibly by blowing gas from the reactor bottom, ensures the thermal and chemical homogeneity of the bath and allows elevated process kinetics.

The materials outletted from the apparatus are shown in Table 3.2.

TABLE 3.2

| | |
|---|---|
| Flue gases outletted from reactor | 2040 t/h |
| Metal phase | 20 kg/h |
| Slag | 250 kg/h |

In Table 3.3, the quantities useful to define a proper carrying out of the process, in terms of chemical reactions and thermal exchange.

TABLE 3.3

| | |
|---|---|
| Hot metal bath stirring power | 0.5 kW/t of metal phase of hot metal bath |
| Metal phase mass/reactor slag mass ratio | 1.0 |

EXAMPLE 4

The features of the embodiment of the apparatus according to the invention used in this example are analogous to those described in the preceding Table 1.1.

The example relates to the use of the apparatus for the treatment of Ni/Cd-containing scrap to be recovered.

The introduced materials and the flow rates thereof are shown in Table 4.1. (kg/h for the solids, Nm3/h for the gases)

TABLE 4.1

| | |
|---|---|
| Ni- and Cd-containing scraps | 1000 kg/h granulometry <200 μm |

TABLE 4.1-continued

| Comburent | 800 Nm3/h O₂ |
| --- | --- |
| Fuel (pit coal) | 770 kg/h |
| Additives | 9 kg/h Al |
| | 60 kg/h (CaO + MgO) |
| Comburent | 80 Nm3/h O₂ |

The recycling of the Ni—Cd-containing scrap, also comprising Ni—Cd batteries, is carried out in presence of a basic slag, in a reducing environment and with process temperatures ranging from 1450 to 1600° C. Such conditions also allow to fix in the slag as stable sulfides the sulfur evolved from the gasified carbon. The nickel oxide is completely reduced to metallic nickel, which, having a low vapour tension at 1600° C., accumulates in the metal phase together with the other metals, possibly extant as such in the charge or evolved from the reduction of the corresponding oxides extant therein. The cadmium, which vaporises at the operative temperature, is outletted with the process flue gases and recovered by downstream plants.

Thus, several advantages are obtained:

quantitative separation of Ni and Cd;

near-complete in-slag sulfur fixation, yielding a low-sulfur metal phase and a nearly sulfur-free process gas;

the coal ashes are quantitatively fixed in the slag phase, by virtue of the filtering capacity of the slag itself. At 1400° C. the molten slag above the hot metal bath has a viscosity lower than 4 Poise, in order to ensure an effective homogeneity of the reaction environment.

The binary basicity of the slag (%CAO/%SiO₂) ranges from 1 to 1.5.

Moreover, the slag composition should be such as to limit the wear of the refractories lining the reactor (carbon-bonded magnesia refractories in the example). The percentage of magnesium oxide in the slag should be greater than 8%.

The thermal state is controlled operating a partial post-combustion of the process gas injecting comburent through a second level of injectors.

The stirring of the system (hot metal bath and molten slag), obtained injecting the abovementioned materials and possibly blowing gas from the reactor bottom, ensures the thermal and chemical homogeneity of the bath and allows elevated process kinetics.

This operation mode yields from the injected materials (powdered pit coal, Ni—Cd battery scraps, fuel, additives) a gaseous phase made of Cd vapours, and, by virtue of the filtering action of the slag, of permanent gases (like nitrogen, carbon monoxide, carbon dioxide and hydrogen) and steam. The gaseous phase is free of harmful compounds like SOx, NOx, chlorinated compounds and dusts.

The process gas continuously outletted from the reactor is piped to the recycling plants. The metal phase and the slag are intermittently tapped from the reactor opening the tap hole provided therefor.

The materials outletted from the apparatus are shown in Table 4.2.

TABLE 4.2

| Permanent gases | 1835 kg/h |
| --- | --- |
| Metal phase | 960 kg/h |
| Slag | 100 kg/h |
| Gas-carried Cd | 23 kg/h |

The quantities useful to define a proper development of the process, in terms of chemical reactions and thermal exchange, are shown in Table 4.3.

TABLE 4.3

| Hot metal bath stirring power | 0.5 kW/t metal phase of hot metal bath |
| --- | --- |
| Metal phase Mass/reactor slag mass ratio | 1.0 |

What is claimed is:

1. A continuous process for transforming, by chemico-physical reactions inside molten slag, materials to be gasified, thermally destroyed, inertized or from which elements of commercial value are to be recovered, comprising providing an apparatus having a single reaction chamber with a substantially cylindrical symmetry, including a top portion and a bottom portion, said top portion communicating with and being functionally distinct from said bottom portion;

optionally introducing into said top portion of the reactor, through a first injection level, a comburent gas for post-combustion of process gasses;

introducing into said bottom portion of said reactor and within molten slag, vertically from the top thereof and/or sideways through a second injection level, combined fuel and comburent, and also introducing material to be transformed and optionally slag inoculants and additives and material-carrying gasses;

optionally introducing stirring gasses into the molten slag within the reactor bottom;

extracting process flue gasses from the top portion of said reactor; and tapping from the bottom portion of the reactor transformed material of controlled composition and inert slag.

2. The process according to claim 1, wherein the introduction into the bottom portion of the reactor of the material to be transformed, the fuel, the comburent, and optionally the slag inoculants and additives and the material-carrying gases, is carried out only sideways or both sideways and vertically from the top portion thereof.

3. The process according to claim 1 wherein the introduction into the bottom portion of the reactor of the material to be transformed, the fuel, the comburent, and optionally the inoculants and additives and the material-carrying gases, is carried out in the radial direction, with a plurality of inlets, optionally on different levels.

4. The process according to claim 1 wherein in the bottom portion of the reactor the material to be transformed, the material-carrying gas, the fuel, a fraction of the comburent and optionally the inoculants and additives, are introduced at the slag core, horizontally or slanting downwards, and the remaining comburent fraction is concomitantly introduced at an upper level.

5. A continuous process for transforming, by chemico-physical reactions inside molten slag, materials to be gasified, thermally destroyed, inertized or from which elements of commercial value are to be recovered, within an apparatus having a single reaction chamber with a substantially cylindrical symmetry, including a top portion and a bottom portion, said top portion communicating with and being functionally distinct from said bottom portion, said process comprising:

optionally introducing into said top portion of the reaction chamber, through a first injection level, a comburent gas for post-combustion of process gasses;

introducing into said bottom portion of said reaction chamber within molten slag, vertically from the top thereof and/or sideways through a second injection level, the material to be transformed, the fuel, the comburent and optionally slag inoculants and additives and material-carrying gasses;

wherein the material to be transformed has a granulometry lower than 5 mm;

optionally introducing stirring gasses into the molten slag within the reaction chamber bottom;

extracting process flue gasses from the top portion of said reaction chamber; and tapping from the bottom portion of the reaction chamber transformed material of controlled composition and inert slag.

6. The process according to claim 1 wherein the granulometry of the fuel and of the additives is lower than 3 mm.

7. A continuous process for transforming, by chemico-physical reactions inside a molten bath, materials to be gasified, thermally destroyed, inertized or from which elements of commercial value are to be recovered, within an apparatus having a single reactor with a substantially cylindrical symmetry, including a top portion and a bottom portion, said top portion communicating with and being functionally distinct from said bottom portion, said process comprising:

optionally introducing into said top portion of the reactor, through a first injection level, a comburent gas for post-combustion of process gasses;

introducing into said bottom portion of said reactor within the molten bath, vertically from the top thereof and/or sideways through a second injection level, the material to be transformed, the fuel, the comburent and optionally slag inoculants and additives and material-carrying gasses;

wherein the injection rate of the comburent into the top portion of the reactor is lower than 40 m/s, and such as to allow the individual jets to intermingle thereamong and the combustion of the process gas fed from the bottom portion of the reactor, and obtaining a heat transfer efficiency (HTE) greater than 70% between the gas and the bath;

optionally introducing stirring gasses into the molten bath within the reactor bottom;

extracting process flue gasses from the top portion of said reactor; and tapping from the bottom portion of the reactor transformed material of controlled composition and inert slag.

8. A continuous process for transforming, by chemico-physical reactions inside molten slag, materials to be gasified, thermally destroyed, inertized or from which elements of commercial value are to be recovered, within an apparatus having a single reactor with a substantially cylindrical symmetry, including a top portion and a bottom portion, said top portion communicating with and being functionally distinct from said bottom portion, said process comprising:

optionally introducing into said top portion of the reactor, through a first injection level, a comburent gas for post-combustion of process gasses;

introducing into said bottom portion of said reactor within molten slag, vertically from the top thereof and/or sideways through a second injection level, the material to be transformed, the fuel, the comburent and optionally slag inoculants and additives and material-carrying gasses;

optionally introducing stirring gasses into the molten slag within the reactor bottom;

extracting process flue gasses from the top portion of said reactor; and tapping from the bottom portion of the reactor transformed material of controlled composition and inert slag;

wherein the binary basicity index of the slag is greater than 1.

9. A continuous process for transforming, by chemico-physical reactions inside a molten bath, materials to be gasified, thermally destroyed, inertized or from which elements of commercial value are to be recovered, within an apparatus having a single reactor with a substantially cylindrical symmetry, including a top portion and a bottom portion, said top portion communicating with and being functionally distinct from said bottom portion, said process comprising:

optionally introducing into said top portion of the reactor, through a first injection level, a comburent gas for post-combustion of process gasses;

introducing into said bottom portion of said reactor and within the molten bath, vertically from the top thereof and/or sideways through a second injection level, the material to be transformed, the fuel, the comburent and optionally slag inoculants and additives and material-carrying gasses;

introducing stirring gas into the molten bath within the reactor bottom, the power provided by the stirring gas being lower than 2.5 kW per ton of hot metal bath;

extracting process flue gasses from the top portion of said reactor; and tapping from the bottom portion of the reactor transformed material of controlled composition and inert slag.

10. A continuous process for transforming, by chemico-physical reactions inside molten slag, materials to be gasified, thermally destroyed, inertized or from which elements of commercial value are to be recovered, within an apparatus having a single reactor with a substantially cylindrical symmetry, including a top portion and a bottom portion, said top portion communicating with and being functionally distinct from said bottom portion, said process comprising:

optionally introducing into said top portion of the reactor, through a first injection level, a comburent gas for post-combustion of process gasses;

introducing into said bottom portion of said reactor within the molten slag, vertically from the top thereof and/or sideways through a second injection level, the material to be transformed, the fuel, the comburent and optionally slag inoculants and additives and material-carrying gasses;

wherein the internal pressure of the reactor ranges from 1 to 4 bars;

optionally introducing stirring gasses into the molten slag within the reactor bottom;

extracting process flue gasses from the top portion of said reactor; and tapping from the bottom portion of the reactor transformed material of controlled composition and inert slag.

11. An apparatus for carrying our a process for the continuous transforming, by chemico-physical reactions inside molten slag, of materials to be gasified, thermally destroyed, inertized or from which elements of commercial value are to be recovered, yielding controlled composition products, characterized in that it comprises:

- a reaction chamber (1) of substantially cylindrical symmetry, having a top portion (2) and a bottom portion (3) for containing molten slag, communicating and functionally distinct therebetween for carrying out the process;
- a substantially frustoconical-shaped connector (4), between the top portion (2) and a flue gas ejection conduit (5), and
- means (6, 7) for concomitantly and jointly feeding, into said bottom portion (3) containing molten slag, sideways and vertically from the top thereof the material to be transformed, the fuel, the comburent and optionally the slag inoculants and additives and the material-carrying gases;
- optionally means (8) for sideways injecting the comburent with said bottom portion containing the molten slag in order to carry out the post-combustion of the process gases;
- a tap hole (9) for the transformed material (10) and the slag (11) yielded; and
- optionally, means for feeding the inert stirring gas onto the reactor bottom.

12. The apparatus according to claims 11, wherein said means for feeding, concomitantly and jointly, the material to be transformed, the fuel, the comburent and optionally the inoculants and additives and the material-carrying gases, into the bottom portion of the reactor, are nozzles, arranged circumferentially to said portion, horizontal or slanting downwards, and oriented centerwise, and optionally at least one lance, vertically arranged so as to directly inject into the molten slag.

13. The apparatus according to claims 12, wherein said nozzles are slanting downwards of an angle ranging from 0 to 40° with respect to the horizontal plane.

14. The apparatus according to claims 11, wherein the ratio between the inside height of the reactor and the inside diameter thereof ranges from 1 to 8.

15. The apparatus according to claims 11, wherein the ratio between the height of the frustoconical-shaped connector and the height of the reactor ranges from 0.2 to 0.5.

16. The apparatus according to claims 11, wherein said means for feeding stirring gas in said bottom portions of the reactor are porous baffles.

17. The apparatus according to claims 11, wherein the cylindrical top portion is differently cooled along the height thereof.

18. The apparatus according to claims 13, wherein the ratio between the inside height of the reactor and the inside diameter thereof ranges from 1 to 8.

19. The apparatus according to claims 18, wherein the ratio between the inside height of the frustoconical-shaped connector and the height of the reactor ranges from 0.2 to 0.5.

20. The process according to claim 9, wherein the introduction into the bottom portion of the reactor of the material to be transformed, the fuel, the comburent, and optionally the inoculants and additives and the material-carrying gases is carried out in the radial direction, with a plurality of inlets, optionally on different levels.

* * * * *